United States Patent [19]

Mulvey

[11] Patent Number: 5,024,419
[45] Date of Patent: Jun. 18, 1991

[54] FAUCET CONNECTOR ASSEMBLY

[75] Inventor: Philip Mulvey, St. Charles, Ill.

[73] Assignee: Euroflex, S.A., Seine, France

[21] Appl. No.: 383,708

[22] Filed: Jul. 24, 1989

[51] Int. Cl.⁵ ............................................. F16K 51/00
[52] U.S. Cl. ...................................... 251/148; 285/8;
285/175; 285/256; 285/332.1; 285/341;
285/354; 138/127
[58] Field of Search ................. 285/52, 8, 53, 54, 256,
285/354, 332, 341, 355, 422, 175, 334.4;
138/109, 123; 251/148

[56]  References Cited

U.S. PATENT DOCUMENTS

| 2,536,552 | 1/1951 | Kutz | 285/341 |
|---|---|---|---|
| 2,752,579 | 6/1956 | Caldwell et al. | 285/48 |
| 3,338,597 | 8/1967 | Mason | 285/52 |
| 3,408,093 | 10/1968 | Epstein | 285/52 |
| 3,519,290 | 7/1970 | Dunlap et al. | 285/354 X |
| 3,831,983 | 8/1974 | Stickler | 285/334.4 |
| 4,083,583 | 4/1978 | Volgstadt | 285/355 X |
| 4,159,027 | 6/1979 | Collet | 138/123 X |
| 4,589,688 | 5/1986 | Johnson | 285/354 |
| 4,679,828 | 7/1987 | Bernardot | 285/175 |
| 4,691,726 | 9/1987 | Studa et al. | 285/354 X |

FOREIGN PATENT DOCUMENTS 630903  11/1961  Canada ................................ 285/256

Primary Examiner—Dave W. Arola
Attorney, Agent, or Firm—Mark I. Feldman

[57] ABSTRACT

An improved faucet connector has a flexible braided metal hose assembly with a water supply fitting assembly at one end and a universal faucet fitting assembly at the other end to readily connect a faucet to a water supply pipe, tubing, or shutoff valve in an efficient, safe, and structurally sound manner.

10 Claims, 3 Drawing Sheets

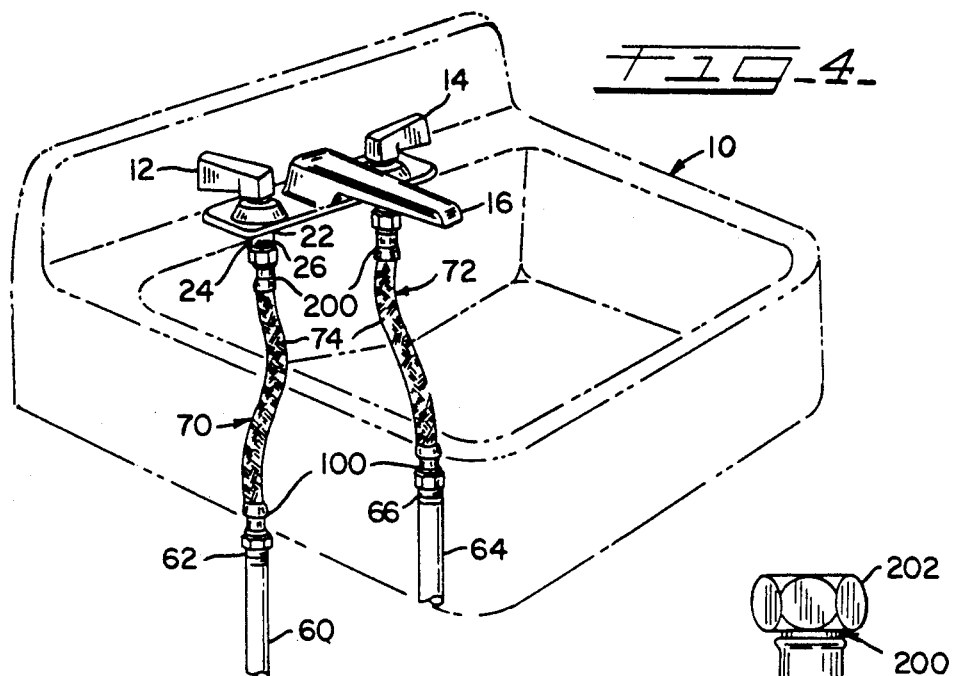
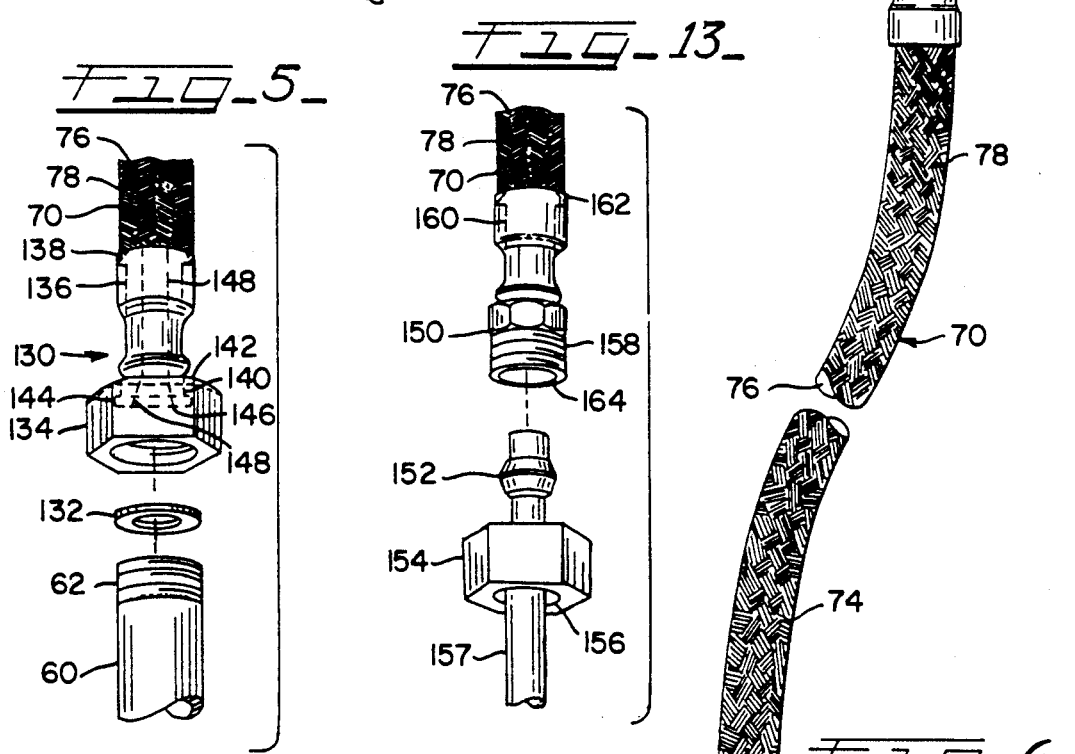
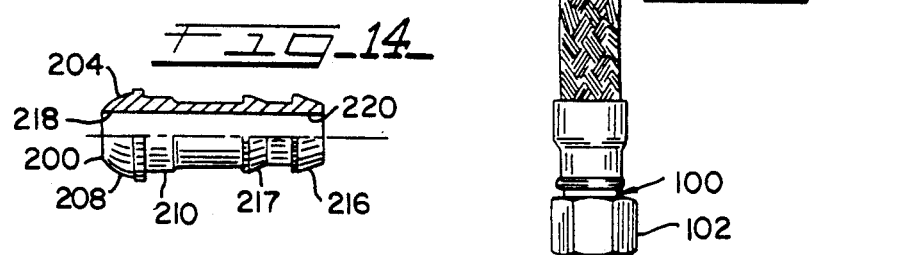

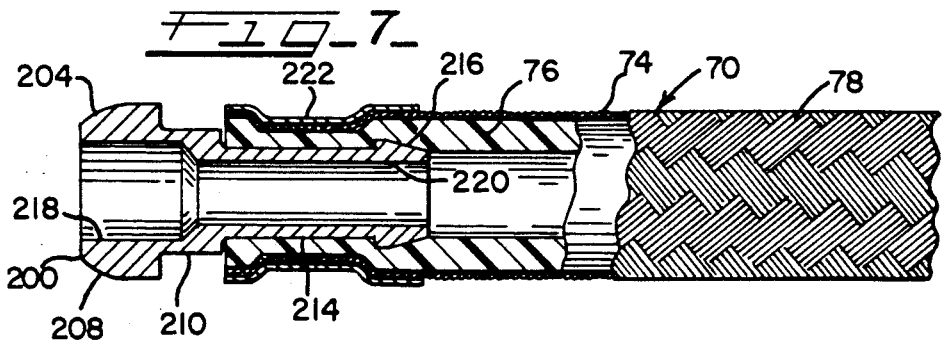
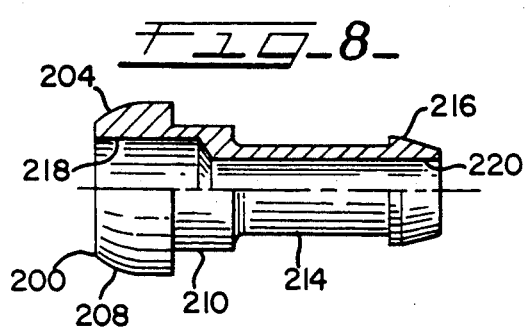
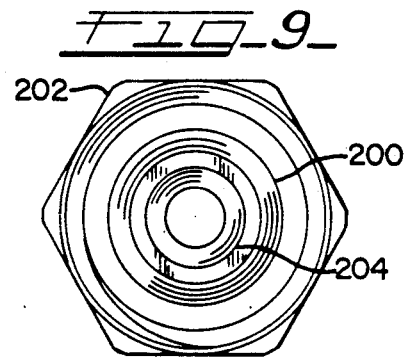
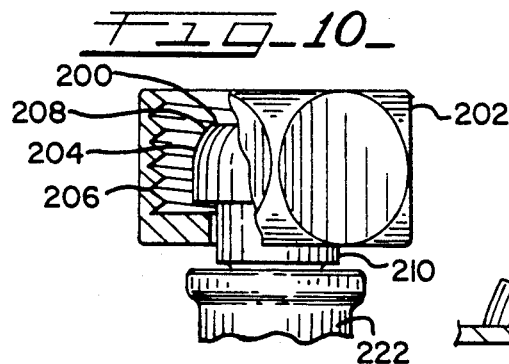
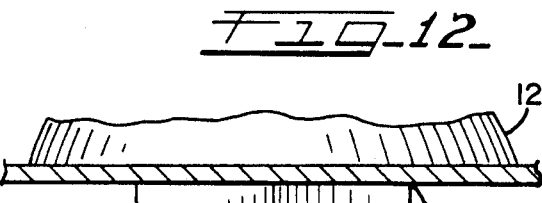
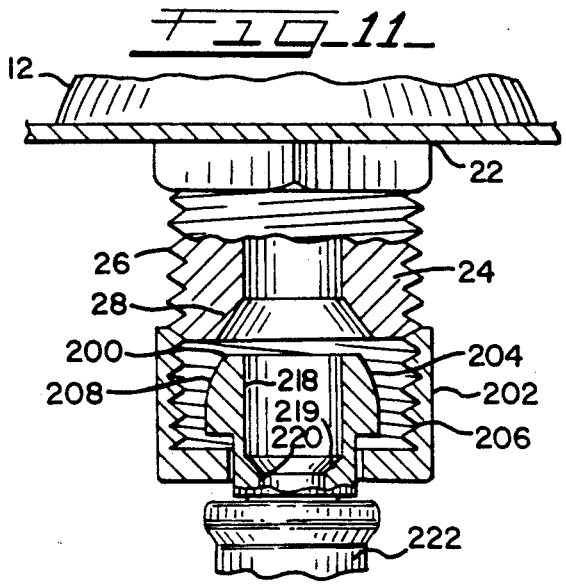
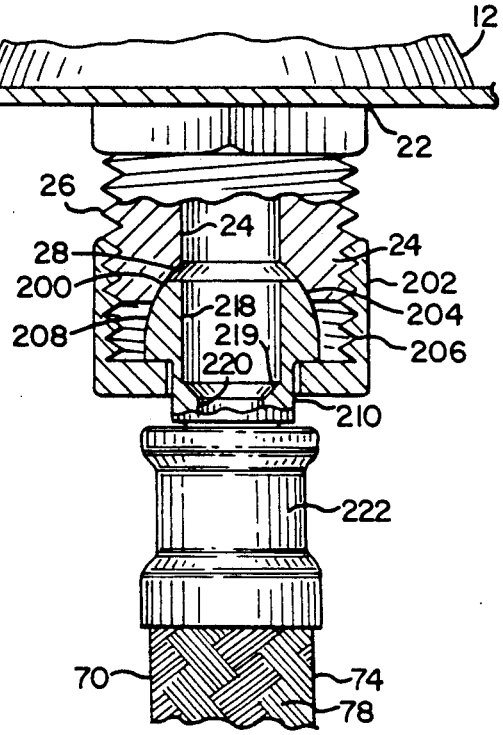

FAUCET CONNECTOR ASSEMBLY

BACKGROUND OF THE INVENTION

This invention pertains to plumbing equipment and, more particularly, to fittings for use with faucets.

In the past, sinks, wash basins, or other appliances were installed, by using a pipe such as a copper pipe which was suitably bent for attachment to the end of a water distribution pipe and the water supply intake of the appliance. The plumber or other installer had to make precise measurements, cut the copper pipe accordingly, shape it and finally connect it by welding. Such tasks were burdensome, cumbersome, and slow and not readily adaptable for do-it-yourself amateurs and most homeowners.

Flexible pipes have been used for connecting a sanitary appliance to a distribution network. Conventional flexible pipes have a copper tubular structure comprising corrugated walls which enable the pipe to be manually bent to the position of the fluid intake on the appliance as well as to the end of the distribution pipe. However, in order to be flexible, this type of tube has an extremely thin fragile metallic wall, which often cracks upon repetitive bending or flexing. Such cracks cause water leaks from the pipe.

The connections of appliances supplied with water using conventional metal pipes have the drawback of transmitting vibrations from the sink or other appliance, when the faucet is turned on, to the supply pipe. The use of a faucet of poor quality on the appliance produces vibrations which can be transmitted to the entire house, or to adjacent apartments and possibly even through the whole building. The connector can also serve to reduce the flow noises associated with plumbing lines.

Rigid supply tube assemblies have been used for many years in the plumbing market with a nosepiece and a rigid body. Typically, a plumber would cut the rigid supply assembly to the required length and bend the rigid or semi-rigid tube into place. This process requires a good deal of skill and most homeowners could not do it by themselves.

Conventional corrugated supply line assemblies have corrugated tubes and were introduced after the rigid supply tube assembly. Corrugated supply line parts allow some degree of flexibility during installation and some supply lines incorporate the use of a flexible head or nosepiece. The flexible head is typically composed of rubber or plastic. The purpose of the nosepiece is to provide a seal against a faucet inlet. The flexible head can be made for specific applications or customers. The body of the corrugated supply assembly allowed some flexibility, but still many homeowners had trouble doing-it-themselves. If the corrugated supply assembly is bent into one position, then bent again to correct a mistake in the alignment, it work-hardens the tubing. Usually, two or three bends work-hardens the tubing to its failure point. The supply tube assembly often splits and forms a hole between one or more of its corrugations causing water leaks.

When a flexible nosepiece is tightened to a faucet, the faucet leaves an impression on the surface of the nosepiece. If it is necessary at some later date to replace the faucet or disconnect the supply, it would be almost impossible to line up the impression a second time and the misalignments can cause a leak.

The next products that entered the market were polyvinyl chloride (PVC) hoses. PVC hoses consists of a flexible vinyl hose with two attached fittings. They are attached to the faucet base by means of a nut using a washer, o-ring, or plastic head. The other end of the PVC hose is attached to a supply valve or supply pipe using a washer or o-ring.

Polybutylene tube supplies are very similar to the traditional rigid supply tube but offer flexibility and a one-piece design.

Plastic and rubber fittings, gaskets, and nosepieces often fail, leak, or otherwise degrade over time with heat and pressure.

Although a hose can be longitudinally extensible for accommodating an internal excess pressure, the flow rate will be reduced if the diameter is decreased. It is important that the flow rate be uniform. It is, therefore, desirable that a connection of this type be dimensionally stable, irrespective of the internal pressure.

One useful type of flexible hose is shown in U.S. Pat. No. 4,159,027. The hose offers flexibility and reliability not found in either PVC or polybutylene hoses and can be equipped with a washer to seal the connection to the faucet base.

The plumbing wholesale trade, however, prefers bulk packaging with washers individually attached to the connectors. This step can involve a great deal of added cost for the handling, the washer and the cap.

Over the years various types of hoses and faucet connectors have been suggested. These prior art hoses and faucet connectors have met with varying degrees of success.

It is, therefore, desirable to provide an improved faucet connector assembly which overcomes most, if not all, of the preceding problems.

SUMMARY OF THE INVENTION

An improved faucet connector assembly is provided which readily, efficiently, and safely connects a faucet to a water supply source, such as to a water supply pipe or shutoff valve. Advantageously, the novel faucet connector assembly comprises a cone-style universal connector which securely fits almost all standard domestic and foreign faucets. While the faucet connector assembly is particularly useful for connecting a faucet, it can also be used for other applications, such as water valves and other plumbing equipment.

Desirably, the inventive faucet connector assembly is economical to manufacture, effective, structurally strong, and dependable. The novel faucet connector assembly is also easy to install and use.

To this end, the novel faucet connector assembly comprises a flexible composite conduit hose assembly with a special universal faucet fitting assembly at one end for connection to an inlet of a domestic or imported foreign faucet and can have a water supply fitting assembly at the other end of the hose assembly for connection to a water supply pipe or shutoff valve. The faucet fitting assembly has a rotatable coupling which annularly surrounds a special tubular cone or cone-style connector. The cone-style connector has a convex faucet fitting head with a downwardly converging end portion.

In the preferred form, the composite conduit comprises a flexible braided metallic hose assembly with a flexible inner tube comprising a water-impervious elastomeric core and a flexible outer sheath or shell comprising interlocking strands of wire. The wire can be made of copper, brass, aluminum or other metals, and is preferably made of stainless steel for best results. The elastomeric core preferably comprises by weight: from about 20% to about 40% ethylene propylene polymer resin, from about 20% to about 30% paraffin-oil, and from about 30% to about 50% carbon black. The elastomeric resin can also include the usual vulcanization additives.

The flexible outer protective shell provides a sheath formed of a metallic braid comprising strands of stainless steel wire. Each strand comprises between 3 and 8 parallel wires. Desirably, the strands form intersecting helices. Each strand follows a line which forms an angle between 35 degrees and 50 degrees with respect to the axis of said hose. The strands surround the elastomeric core without discontinuity to assure a continuous flexible protective shell around the elastomeric core.

Preferably, the faucet fitting assembly comprises a universal tubular one-piece faucet fitting with an arcuate faucet inlet-engaging cone-like head and a convex outer face. A shoulder integrally extends from the head and has a coupling nut-supporting bearing surface. The faucet fitting has a tapered frustoconical foot which fits into the faucet-facing end of the braided metallic hose assembly and a sleeve which extends between and integrally connects the foot and shoulder. An enlarged coupling nut rotates about and is supported on the annular nut-supporting surface of the shoulder. In order to enhance the structural strength and integrally of the connection, the coupling nut and universal faucet fitting are made of rigid metal, such as stainless steel, aluminum, copper or other rigid metal, and are most preferably made of brass for best results. It is also possible to manufacture the fittings from an engineering grade plastic resin.

Desirably, the novel faucet connector assemblies can be used for connecting an appliance supplied with both a hot water distributing network and a cold drinking water network.

A more detailed explanation of the invention is provided in the following description and appended claims taken in conjunction with the accompanying drawings.

BRIEF DESCRIPTION OF THE DRAWINGS

FIG. 4 is a perspective view of water supply pipes and a sink connected by a faucet connector assembly in accordance with principles of the present invention;

FIG. 5 is an exploded perspective view of the other end of the faucet connector assembly before being connected to a water supply pipe;

FIG. 6 is a fragmentary side view of the faucet connector assembly;

FIG. 7 is a cross-sectional view of the faucet connecting portion of the hose assembly;

FIG. 8 is a side view of the faucet fitting;

FIG. 9 is an end view of the faucet fitting assembly;

FIG. 10 is a fragmentary cross-sectional view of the faucet fitting assembly;

FIG. 11 is a cross-sectional view of the faucet fitting assembly being connected to the inlet of a faucet;

FIG. 12 is a side view of the faucet fitting assembly connected to the inlet of the faucet;

FIG. 13 (between FIGS. 5 and 6) is an exploded perspective view of the other end of the faucet connector assembly being connected to copper tubing; and FIG. 14 is a cross-sectional view of another faucet fitting.

DETAILED DESCRIPTION OF THE PREFERRED EMBODIMENT

Figure 1:
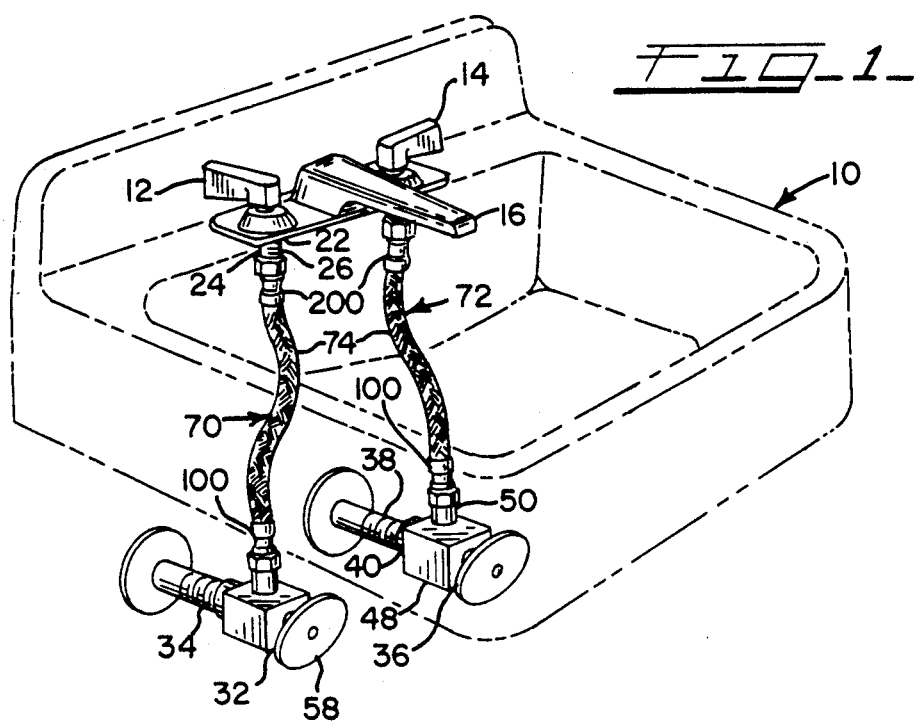
FIG. 1 is a perspective view of a sink equipped with a faucet connector assembly in accordance with principles of the present invention.
Figure 3:
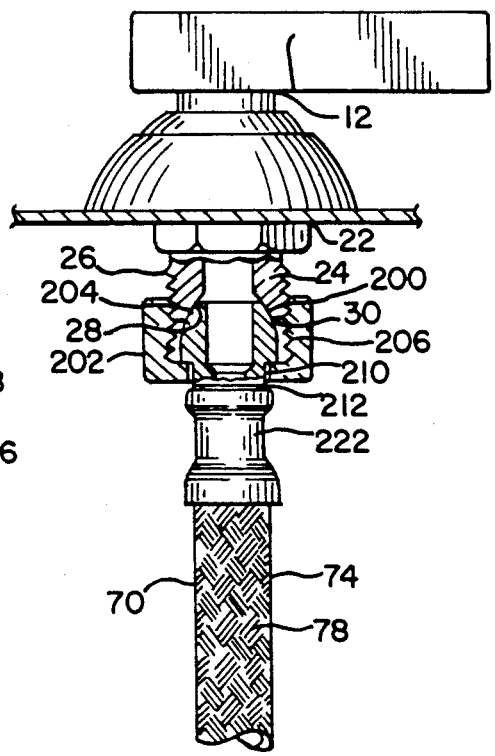
FIG. 3 is a cross-sectional view of a faucet connector assembly connected to the inlet seat of a faucet.

As shown in FIG. 1 a sink 10 or wash-basin has a hot water faucet 12, a cold water faucet 14, a swivel water outlet and discharge 16. The hot and cold water faucets 12 and 14 are structurally similar. Each of the faucets 12 and 14 has a base 22 (FIG. 3) with a downwardly extending vertical inlet 24 having external threads 26 and an inner wall 28 providing a downwardly diverging tapered faucet seat 30. The inlet 24 and base 22 of the faucet 12 and 14, are typically made of metal, such as brass or of plastics.

A hot water shutoff valve 32 (FIGS. 1 and 2) is connected via pipes 34 to a hot water supply, such as a hot water heater. A cold water shutoff valve 36 is connected via pipes 38 to a cold water supply, such as a cold water municipality line. The hot and cold water valves 32 and 36 are structurally similar.

Figure 2:
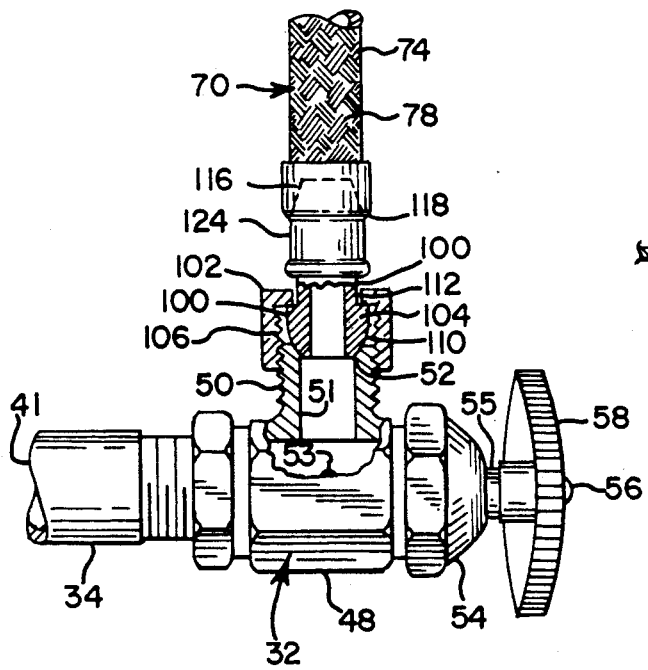
FIG. 2 is a cross-sectional view of the other end of the faucet connector assembly connected to a shutoff valve.

An externally threaded compression outlet 50 providing a valve seat 52 extends from the intermediate body portion 48. The outlet 51 is in communication with the inlet 41. Flow of water into the outlet 51 from the inlet 41 is controlled by an interior valve 53 at the inner end of a valve stem 55. The valve can open or close (block) the flow of water from the inlet 41 to the outlet 51. The rounded front end of the intermediate body portion provides a bonnet 54. The valve stem 55 extends outwardly of the bonnet 54 and is connected by a screw 56 or other fastener to a manually rotatable handle 58. The handle 58 can be turned to open and close the internal valve within the interior of the intermediate body portion 48 of the valve assembly. Many styles of shut-off valves are available and are utilized in installations. The purpose of the shut-off valves remain the same, namely, to allow the flow of water to be shut-off (blocked). The illustrations of the shut-off valves in FIGS. 1 and 2 are meant solely as examples of an installation.

Alternatively, as shown in FIGS. 4 and 5, a hot water rigid supply pipe 60 with an upright externally threaded hot water outlet 62 can be connected to a hot water supply, such as a hot water heater. A cold water rigid supply pipe 64 with an upright externally threaded cold water outlet 66 can be connected to a cold water supply, such as a cold water line. It is also possible to connect directly to the water supply pipe by means of compression type fittings.

A hot water flexible faucet connector assembly and unit 70 (FIGS. 1 and 4) connects the hot water faucet 12 to the hot water shutoff valve 32 (FIG. 1) or the hot water supply pipe 60 (FIG. 4). A cold water flexible faucet connector assembly and unit 72 connects the cold water faucet 14 to the cold water shutoff valve 36 (FIG. 1) or the cold water supply pipe 64 (FIG. 4). The hot and cold water faucet connector assemblies 70 and 72 are structurally similar. Each of the faucet connector assemblies 70 and 72 has an elongated, composite flexible hose assembly 74 providing a flexible braided metallic hose, tube, or conduit which is shown in greater detail in FIG. 6. The flexible hose assembly 74 has a tubular water-impermeable, fluid-proof core 76 (FIG.

7) made of elastically deformable resilient material such as a synthetic rubber or thermoplastic. The flexible hose assembly 74 also has an outer flexible, protective, reinforcing sheath coating or shell 78 comprising braided metallic wires. The braided wire is preferably made of stainless steel for best results, although other types of metal wire can be used if desired.

The braided metallic hose 74 is flexible and may take any shape and configuration necessary for connecting the wash-basin 10, to the upper open ends (outlets) of the pipes 60 and 64 (FIG. 4) or shutoff valves 32 and 36 (FIG. 1). The flexibility of the connecting hose 74 enables the outlet of the shut off valves 32 and 36 (FIG. 1) or rigid pipes 60 and 64 (FIG. 4) to be easily connected to the faucet 12 and 14 thereby avoiding the bending or welding of a rigid pipe connecting section.

As shown in FIG. 7, the braided metallic hose 74 comprising the flexible hose assembly has an inner elastomeric tube 75 providing a resilient tubular core made of synthetic rubber or thermoplastic which is annularly surrounded and protected by an outer flexible metallic braided shell 78.

The sink can be equipped as early as the manufacturing stage with the flexible connecting hose so that the sink arrives on the site already provided with this accessory fixed and connected thereto. The flexible hose can then be bent, twisted and curved, as appropriate, to and take all desired inflections or incurvations necessary to approach the outlet end of the open distributing pipe or shutoff valves so as to enable connection by simply screwing the nut. Assembly is therefore easy and heavy equipment does not have to be used in situations for making welds or for bending the metallic connection tubes as was previously needed.

The flexible connector assembly 70 and 74 avoids the transmission of vibrations and reduces water flow noises along the pipes network in a building. The water distributing network is a source of noise by the vibrations that they create when fluid passes therethrough, for example in faucets. The supple flexible hose used according to the invention, by the very absorbant nature of the material of which it is constituted, avoids transmission of these vibrations and consequently the undesirable sound effects caused therefrom.

The core 76 of the hose assembly 74 is preferably made of an elastomeric resin having the following composition by weight:

from 20% to 40% ethylene propylene polymer;
from 20% to 30% paraffin-oil; and
from 30% to 50% carbon black.

The elastomeric resin can include the usual vulcanization additives.

The composition of the core 76 of the hose assembly has a Shore hardness of 70, a breaking strength of 120 kg per cm$^2$ and an elongation at break of 250%.

The flexible hose assembly 74 has qualities of suppleness and elasticity which enable it to lend itself to the different deformations necessary for following the configuration enabling the intake of water in the sink (sanitary appliance) on the one hand to be connected to the end of the intake of the water distribution supply pipe or shutoff valve.

The flexible hose assembly 74 also has the advantage of being inert (neutral) from a chemical and biological point of view and it is suitable for conveying drinking water without imparting any odor or taste.

The biological inertia of the hose (core) resists the formation of efflorescence. The core also enables water to be conveyed at a temperature close to 100 degrees C. without producing parasitic conditions and without accelerating hardening, aging, etc.

The flexible metallic braided outer protective shell (sheath) 78 of the hose assembly 74 is made of braided strands and is mounted on the elastomeric core (tube) 76. The sheath 78 is made of strands comprising between 3 and 10, and preferably 6 wires. The pitch of the braiding during manufacture is 33 mm and at an angle of about 45 degrees. The braiding is effected under tension. The tension springs being calibrated between 0.450 and 700 grams. After relaxation on leaving the machine, the braiding undergoes a shrinkage which sheaths and tightens on the elastomeric core 76 and the pitch is returned to 30 mm. The angle formed by the line followed by each strand and the axis of the hose is substantially 45 degrees. Six wires of 0.22 mm are used for each strand. In this way, a sheath 78 is obtained which firmly holds the elastomeric core 76 while ensuring a good suppleness and allowing movements of flexion of the connecting hose.

The hose assembly 74 is crimped so that the rubber core 76 is compressed by between about 45 and 50% of its thickness. This compression makes it possible to obtain a reliable crimping. If the compression of the synthetic rubber core 76 exceeds the threshold of 50%, the elasticity of the synthetic rubber is compromised, particularly during the passage of hot water and after a succession of hot and cold cycles. The loss of elasticity of the rubber, which has been over or under compressed, may no longer assures the proper tightness and seal.

A faucet which is at the limit of the "mediocre" class, from a noise transmission point of view, can pass easily into "superior" class if it is connected to the flexible connector assembly 74 of the invention.

The elastomeric core 76 (hose) which conveys the water is extremely supple and of sufficient elasticity to allow the hose to adapt itself without tension to different radii of curvature. The elasticity of the elastomeric core 76 is compensated by a sheathing of the metallic braided outer shell 78 such that latter ensures the suppleness of the hose while assuring its dimensional stability and opposing any movement of extension or retraction which would adversely modify the diameter of the fluid passageway.

The flexible braided metallic composite hose, tube or conduit 74 of the flexible faucet connector assembly 70 and 72 can be bent and twisted as needed about obstacles or other structure between the faucet 12 and 14 and the shutoff valve 32 and 36 or supply pipe 60 and 64 (FIGS. 4) or tubing, such as copper tubing 157 (FIG. 13). Each flexible braided metallic composite hose has an outer stainless steel braided wire outer shell 78 about an inner resilient elastomeric synthetic rubber tube 76. The water supply-facing end of the flexible braided metallic composite hose is connected to a water supply fitting assembly 100 providing a valve fitting assembly or supply pipe fitting assembly. The valve fitting assembly fits upon, sealingly engages, and is connected to the outlet of a shutoff valve 32 or 36 (FIG. 1). The supply pipe fitting assembly fits upon, sealingly engages and is connected to the outlet of a supply pipe 60 or 64 (FIG. 4). The valve fitting assembly and supply pipe fitting assembly are structurally similar, except as described hereinafter. The upper faucet-facing end of the flexible braided metallic composite hose is connected to a faucet fitting assembly 200. The faucet fitting assembly fits upon, sealingly engages, and connected to the inlet of the base of the faucet.

As best shown in FIG. 2, the valve fitting assembly 100 comprises a rotatable hexagonal compression nut 102 positioned about a stationary tubular valve fitting 104. The compression nut 102 and valve fitting 104 are preferably made of brass for best results, although other types of materials, such stainless steel or an engineering grade plastic resins can be used if desired. The compression nut 102 has internal threads 106 which threadedly engage the external threads 50 of the compression outlet 51 about the valve seat 52. The valve fitting 100 is fixedly secured to the lower end of the flexible braided metallic composite hose 74 as described below. The valve fitting 100 has an enlarged convex, rounded tubular, tapered foot or valve fitting-nosepiece 110 which seals, seats, and press fits against the interior wall of the valve seat 52 of the compression outlet 50 of the shutoff valve 32 and 36. Extending integrally upwardly from the valve-fitting nosepiece 110 is a neck 112. The outside diameter of the neck 112 is smaller than the maximum diameter of the valve-fitting nosepiece 110. The compression nut 102 rotates and pivots about the neck 112. A tapered frustoconical, tubular hose engaging outlet end portion providing a hose barb or finger 116 is integrally connected to the neck and engages and snugly fits into the lower end of the flexible braided metallic composite hose 74. A tubular crimping ferrule 118 is securely crimped and fixedly connected to the neck 112. The crimping process permanently attaches the fittings to the composite hose 74. In the crimping process, a cylindrical tubular blank or ferrule is crimped about and form fitted snugly against the mating fitting and other parts to have a complementary shape thereto. The crimping process helps secure and connect the mating fitting and other parts.

The supply fitting assembly of FIG. 5 comprises a tubular threaded pipe fitting or threaded water supply fitting 130, a washer 132, and a female internally threaded nut 134 for threadedly engaging the externally threaded water supply pipe 60 or 64 (FIG. 4). The fitting has an elongated neck 136 (FIG. 5) and a frustoconical hose barb 138 which extends outwardly from the neck 136 to snugly engage and fit within the hose 76. The fitting also has a shoulder 140 which is integrally connected to the neck 136 and fits against and seats upon the collar 142 of the nut 134. The fitting further has an enlarged an circular fitting head 144 which is integrally connected to the shoulder 140. The head 144 has a generally planar or flat circular face 146 upon which the washer 132 is seated. The head 144 also has a central flared, chamfered, or countersunk hole 148 which communicates with an internal passageway 148 that extends through the neck 136 for communication with the hose 76 and pipe 60 or 64.

The supply fitting of FIG. 13 has a tubular compression fitting 150, a compression ring 152, and an internally threaded compression nut 154 with a collar 156 that is positioned against, engages, and compresses the compression ring 152 about tubing, such as copper tubing 157. The compression fitting 150 has an externally threaded portion 158 which threadedly receives and engages the internally threaded compression nut 154. The compression fitting 150 also has an elongated neck 160 and a frustoconical hose barb 162 that extends outwardly of the neck 160 to snugly engage and fit within the hose 76. The tubular compression fitting has an internal axial passageway 164 which communicates with the hose 76 and tubing 157.

As shown in FIGS. 3 and 10-12, the faucet fitting assembly 200 attached to the upper end of the flexible braided metallic composite hose 74 has a rotatable hexagonal female coupling nut 202 positioned about a one-piece, unitary, universal, stationary, integral, cone-style faucet fitting 204. The coupling nut 202 and faucet fitting 204 are preferably made of rigid screw machine brass for best results, although in some circumstances it may be desirable that it be made of stamped brass or made of other types of metal such as stainless steel, or they can be made of an engineering grade plastic resin. The internal threads 206 (FIG. 10) of the coupling nut 202 threadedly engage the external threads 26 of the faucet inlet 24 about the seat 30 at the base 22 of the faucet 12 and 14.

The faucet fitting 204 (FIG. 7) is fixedly secured to the flexible braided metallic composite hose 74 as described below. The faucet fitting 204 (FIG. 8) has an arcuate enlarged flared convex, rounded tubular, tapered, universal faucet fitting cone-style head 208 which provides a tubular faucet base-engaging cone, sealer, adapter, connector, and faucet seat-engaging nosepiece with a convex outer face that seals, seats, wedges, and press fits against the interior wall 28 (FIGS. 3, 11, and 12) of the faucet seat 30 of the inlet 24 of the base 22 of almost every type of domestic and foreign faucet. While the illustrated faucet seat is vertical, there could also be a horizontal installation, such as in a bathtub. Extending integrally downwardly from the cone 208 is a tubular shoulder 210. The outside diameter of the shoulder 210 is smaller than the maximum diameter of the cone 208. The coupling nut 202 (FIGS. 9-12) rotates and pivots about the annular, nut-supporting outer bearing support surface of the shoulder 210 (FIG. 8). An elongated tubular sleeve or main body portion 214 (FIG. 8) extends integrally downwardly from the shoulder 210. The outside diameter of the sleeve 214 is smaller than the maximum diameter of the shoulder 210. A tapered downwardly converging, frustoconical, tubular hose-engaging inlet end portion providing a hose barb or foot 216 is integrally connected to the sleeve 214 and engages and snugly fits into the upper end of the flexible braided metallic composite hose 74 (FIG. 7). The faucet fitting 204 has an elongated inlet passageway 220, that extends along the axis of the foot 216, sleeve 214 and lower portion of the shoulder 210, and has a larger outlet passageway 218 that extends through the axis of the cone 208 and upper portion of the shoulder 210. The inlet passageway 220 has a smaller diameter and is is in coaxial alignment with the outlet passageway 218 of the faucet fitting 200. An intermediate frustoconical passageway 219 connects the inlet and outlet passageways 220 and 218.

The cone-style faucet fitting of FIG. 14 is similar to the cone-style faucet fitting of FIG. 8 except it can fit a larger diameter hose and has two hose barbs 216 and 217 (an intermediate hose barb 217 and a terminal hose barb 216).

A tubular crimping ferrule 222 (FIGS. 3 and 12) is securely crimped and fixedly connected to the faucet fitting at a position radially about the neck 214. The crimping process permanently attaches the fittings to the composite hose 74.

Advantageously, the a faucet cone 204 provides a one-piece connection with no washers. Preferably, the cone 204 is made of brass for best results, although other materials, such as stainless steel or an engineering grade plastic resin, can be used. The faucet cone 204 itself is rigid but the hose 74 is flexible and can fully accommodate water shock, water hammer, misalignment, bending, vibration, and stress. The hose is engineered to handle the stresses from these elements.

The fittings located at each end of the connector assembly for coupling to the faucet and the shutoff valve or water supply pipes provide high security and fluid-tight structurally strong connections by resisting fluctuations and stresses of pressure and temperature variations.

The faucet connector assembly can also be used with stop valves without compression threads, such as a ½ inch pipe thread angle stop. The faucet connector assembly can also be connected directly to a threaded pipe without a washer. Furthermore, the faucet connector assembly can have a faucet fitting assembly at both ends.

Other than the applicant, no manufacturer or anyone else has combined a faucet cone on a metallic braided hose or provided the novel flexible connector assembly of this invention.

Among the many advantages of the novel faucet connector assembly are:
1. Universally adaptable and useable with all standard faucets, shutoff valves, and water supply pipes.
2. Superior connector and seal between faucets and appliances, and shutoff valves and water supply pipes.
3. Excellent structural strength and integrity.
4. Outstanding resistance to stress and failure.
5. Better protection against leaks.
6. Greater longevity and wear.
7. Easier to manufacture, store, and ship.
8. Simpler to use.
9. Easy to install and remove.
10. Convenient.
11. Economical.
12. Reliable.
13. Effective.
14. Efficient.

Although embodiments of the invention has been shown and described, it is to be understood that various modifications and substitutions, as well as rearrangements of parts, can be made by those skilled in the art without departing from the novel spirit and scope of this invention.

What is claimed is:
1. A faucet connector assembly, comprising:
a flexible bendable elongated braided metallic hose assembly for flexibly extending downwardly from a base of a faucet to an outlet of a water supply distribution source selected from the group consisting of a water supply pipe, tubing, and a shutoff valve, said faucet inlet having an inner wall providing a downwardly diverging faucet seat, said hose assembly having a flexible braided metallic outer shell annularly surrounding a resilient flexible inner tube comprising a substantially water-impermeable elastomeric core, and said hose assembly having an upper faucet-facing end for positioning adjacent said faucet inlet and a lower water supply-facing end for positioning adjacent said outlet of said water supply distribution source; and
universal faucet fitting means comprising a faucet fitting assembly connected to said upper faucet-facing end of said braided metallic hose assembly for sealingly engaging and connection to said faucet inlet, said faucet fitting assembly having a rotatable internally threaded metal coupling nut for threadedly engaging said externally threaded faucet inlet and having a unitary universal stationary faucet fitting about which said coupling nut rotates, said unitary faucet fitting having a universal arcuate tubular faucet fitting head defining a substantially rigid cone-style connector with a convex outer face for seating and wedging against said inner wall of said inlet in press fitting engagement with said downwardly diverging faucet seat, a tubular shoulder extending integrally downwardly from said faucet fitting-head providing a bearing support surface for supporting said rotatable coupling nut, said shoulder having an upper portion and a lower portion, an elongated sleeve providing a main body portion extending integrally downwardly from said shoulder, said shoulder having a larger outside diameter than said sleeve but having a smaller outside diameter than the maximum outside diameter of said faucet-fitting head, at least one downwardly converging frustoconical tubular foot extending integrally downwardly from said sleeve for snugly fitting into said upper faucet-facing end of said braided metallic hose assembly, said foot, sleeve, shoulder and head of said unitary faucet fitting being integral and in coaxial alignment with each other along an axis, said faucet fitting defining an elongated inlet passageway extending along said axis through said foot, sleeve and lower portion of said shoulder and defining a larger outlet passageway extending along said axis through said arcuate faucet fitting head and upper portion of said shoulder, said outlet passageway communicating with said inlet passageway and said faucet inlet, said outlet passageway having a larger diameter than said inlet passageway, said faucet fitting defining an intermediate frustoconical passageway connecting said inlet passageway and said outlet passageway, and said faucet fitting assembly having a tubular crimping member.

2. A faucet connector assembly in accordance with claim 1 including a water-supply fitting assembly attached to said lower water supply-facing end of said braided metallic hose assembly for sealingly engaging and connection to said outlet of said water supply distribution source.

3. A faucet connector assembly in accordance with claim 1 wherein said flexible braided metallic outer shell of said elongated braided metallic hose assembly comprises strands of wire, each of said strands comprising between 3 and 8 substantially parallel wires, said strands being positioned at an angle ranging from about 35 degrees to about 50 degrees relative to an axis of said elongated braided metallic hose assembly.

4. A faucet connector assembly, comprising:
a flexible bendable elongated braided metallic hose assembly for flexibly extending downwardly from a base of a faucet to an outlet of a water supply distribution source selected from the group consisting of a water supply pipe, tubing, and a shutoff valve, said faucet inlet having an inner wall providing a downwardly diverging faucet seat, said hose assembly having a flexible braided metallic outer shell annularly surrounding a resilient flexible inner tube comprising a substantially water-impermeable elastomeric core, and said hose assembly having an upper faucet-facing end for positioning adjacent said faucet inlet and a lower water supply-facing end for positioning adjacent said outlet of said water supply distribution source;

a water supply fitting assembly connected to said lower water supply-facing end of said braided metallic hose assembly for sealingly engaging and connection to said outlet of said water supply distribution source, said water supply fitting assembly having a rotatable internally threaded nut, a neck having a frustoconical hose barb for snugly fitting into said lower water supply-facing end of said braided metallic hose assembly, and a crimping member for crimpingly engaging and securing said neck to said hose assembly; and a faucet fitting assembly connected to said upper faucet-facing end of said braided metallic hose assembly for sealingly engaging and connection to said faucet inlet, said faucet fitting assembly having a rotatably internally threaded metal coupling nut for threadedly engaging said externally threaded faucet inlet and having a unitary universal stationary faucet fitting about which said coupling nut rotates, said unitary faucet fitting having a universal arcuate tubular faucet fitting head defining a substantially rigid cone-style connector with a convex outer face for seating and wedging against said inner wall of said inlet in press fitting engagement with said downwardly diverging faucet seat, a tubular shoulder extending integrally downwardly from said faucet fitting-head providing a bearing support surface for supporting said rotatable coupling nut, said shoulder having an upper portion and a lower portion, an elongated sleeve providing a main body portion extending integrally downwardly from said shoulder, said shoulder having a larger outside diameter than said sleeve but having a smaller outside diameter than the maximum outside diameter of said faucet-fitting head, at least one downwardly converging frustoconical tubular foot extending integrally downwardly from said sleeve for snugly fitting into said upper faucet-facing end of said braided metallic hose assembly, said foot, sleeve, shoulder and head of said unitary faucet fitting being integral and in coaxial alignment with each other along an axis, said faucet fitting defining an elongated inlet passageway extending along said axis though said foot, sleeve and lower portion of said shoulder and defining a larger outlet passageway extending along said axis through said arcuate faucet fitting head and upper portion of said shoulder, said outlet passageway communicating with said inlet passageway and said faucet inlet, said outlet passageway having a larger diameter than said inlet passageway, said faucet fitting defining an intermediate frustoconical passageway connecting said inlet passageway and said outlet passageway, and said faucet fitting assembly having a tubular crimping member.

5. A faucet connector assembly in accordance with claim 4 wherein said water supply distribution source comprises a shutoff valve with external threads for threadedly engaging said internally threaded nut and said water supply fitting assembly comprises a valve fitting assembly with a convex tubular nosepiece for seating against said outlet.

6. A faucet connector assembly in accordance with claim 4 wherein said water supply distribution source comprises an externally threaded water supply pipe for threadedly engaging said internally threaded nut and said water supply fitting assembly comprises a threaded pipe fitting with an annular fitting head and a washer.

7. A faucet connector assembly in accordance with claim 4 wherein said water distribution source comprises tubing and said water supply fitting assembly comprises a compression ring for receiving said tubing and a compression fitting with an externally threaded portion for threadedly engaging said internally threaded compression nut.

8. A faucet connector assembly in accordance with claim 4 wherein:

said core has a Shore hardness of about 70, a breaking strength of about 120 Kg per $cm^2$, an elongation at break of about 250%, said core comprising a substantially chemically and biologically inert elastomeric material with respect to the water being passed therethrough; and said shell comprises strands of stainless steel wire, each strand comprising between 3 and 8 parallel wires, said strands intersecting in a helical matrix, each strand following a line forming an angle between about 35 degrees and about 50 degrees with respect to the axis of said hose assembly, each strand contacting each adjacent strand to define a substantially continuous sheath around said elastomeric core so as to permit said braided metallic hose assembly to substantially resist the pressure of water passing through said hose assembly.

9. A faucet connector assembly in accordance with claim 8 wherein said core comprises by weight:

from about 20% to about 40% ethylene propylene polymer resin;

from about 20% to about 30% paraffin oil; and from about 30% to about 50% carbon black.

10. A faucet connector assembly in accordance with claim 8 wherein each of said strands of said shell comprises 6 wires of tempered stainless steel, said strands being at an angle of about 45 degrees with respect to the axis of said hose assembly, and said crimping member compressing said core by between about 45% and about 50% of its expanded thickness.

* * * * *